J. F. Seiberling.
Harvester Dropper.
Nº 57583      Patented Aug. 28, 1866.
Fig. 1.
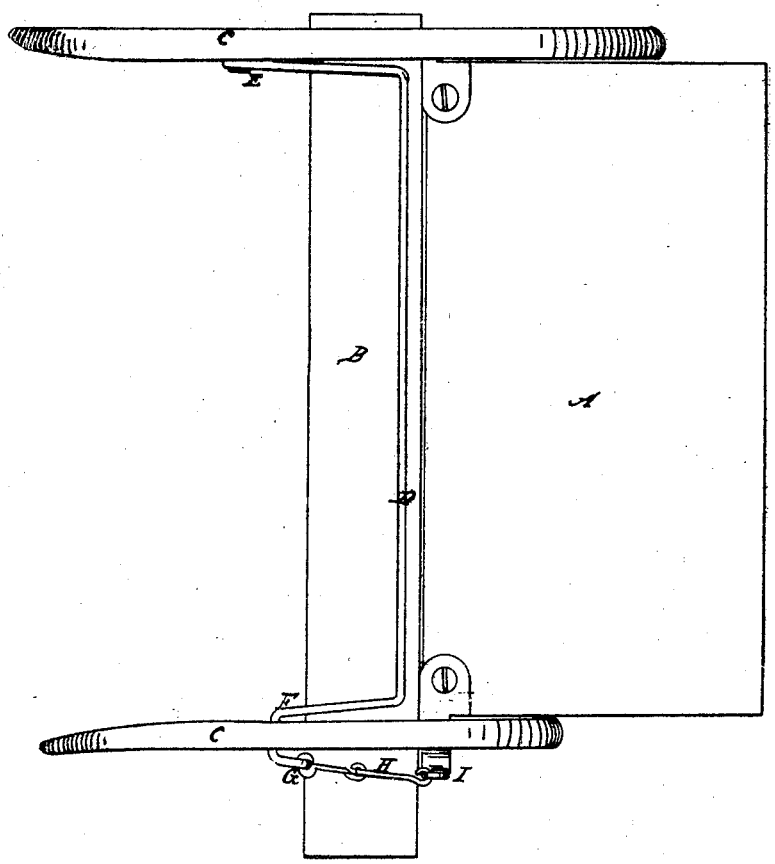
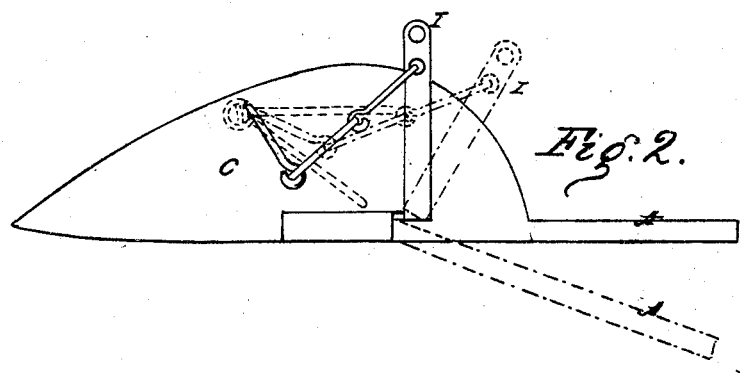
Fig. 2.
Witnesses
Bella Skellman
G. E. Breed
Inventor
John F. Seiberling
Daniel Breed Atty

UNITED STATES PATENT OFFICE.

JOHN F. SEIBERLING, OF AKRON, OHIO.

IMPROVEMENT IN HARVESTERS.

Specification forming part of Letters Patent No. 57,583, dated August 28, 1866.

*To all whom it may concern:*

Be it known that I, JOHN F. SEIBERLING, of Akron, in the county of Summit and State of Ohio, have invented a new and useful Improvement in Harvesting-Machines; and I do hereby declare that the following is a full and exact description thereof, reference being had to the accompanying drawings, and to the letters of reference marked thereon.

My invention relates to that class of cut-off rods or bails of harvesting-machines in which the cut-off rod lies upon the finger-beam or bar or the front of the platform until a gavel is accumulated, and then the cut-off rises to separate the gavel from the falling grain and falls again under the grain or accumulating gavel.

My invention consists in a peculiar arrangement of cut-off rod, in combination with a dividing-board and dropping-platform, so that the first movement of the rod in falling will be downward and away from the leaning grain.

In the accompanying drawings, Figure 1 is a top view of my improved cut-off rod attached to the dividing-boards of a harvesting-machine. Fig. 2 is a side view of the same, showing the motion of the cut-off and of the dropping-platform.

In the use of my new cut-off rod the platform A, the finger-beam B, and the dividing-boards C may be of the usual construction.

The cut-off rod D is hinged or pivoted at E and F to the dividing-boards C, so as to fall upon the beam B. At the hinge F the rod or wire passes through the inside dividing-board, and after passing is bent to form the crank-arm G, which is connected by a chain, H, to an arm, I, upon the tilting platform. By this arrangement the falling of the platform A carries back the arm I, thus pulling upon the chain H and crank-arm G and raising the rod D from the beam B. When the platform is raised the rod again falls upon the beam.

The construction of this cut-off is very cheap as compared with other similar rods. The cut-off or bail being hinged above and forward of the cutter-bar, its first motion in rising is upward and backward, thus raising the butts of the grain or gavel and assisting the dropping-platform in the discharge; but the second motion of the rod or bail in rising is upward and forward, thus easily separating the gavel from the falling grain, which is now arrested in an oblique or leaning position.

When the cut-off or bail falls its first motion is downward and backward, away from the leaning grain, so that short grain cannot be pushed forward by this falling of the bail, as often happens with bails or cut-off rods hinged in the usual manner. This motion of the rod away from the grain instead of toward the grain is a very important advantage of my invention.

What I claim is—

The arrangement of the cut-off rod D, with the crank-arm G, and arm I substantially in the manner described, so that the first movement of the rod in falling will be downward and away from the leaning grain, substantially as and for the purposes set forth.

J. F. SEIBERLING.

Witnesses:
JOHN J. WAGONER,
CHAS. CRANZ, Jr.